Figure 3:
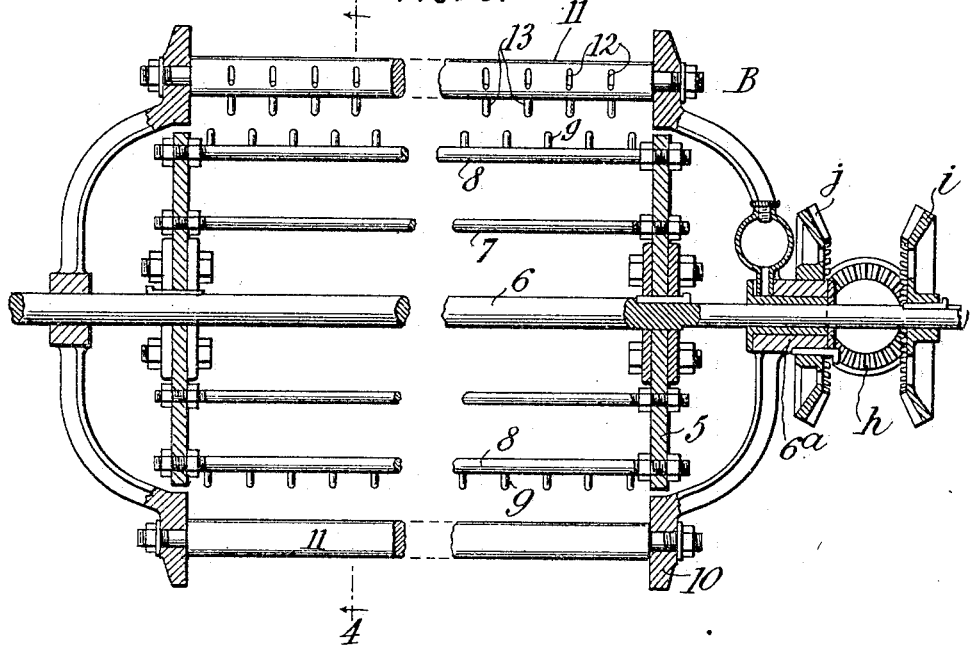

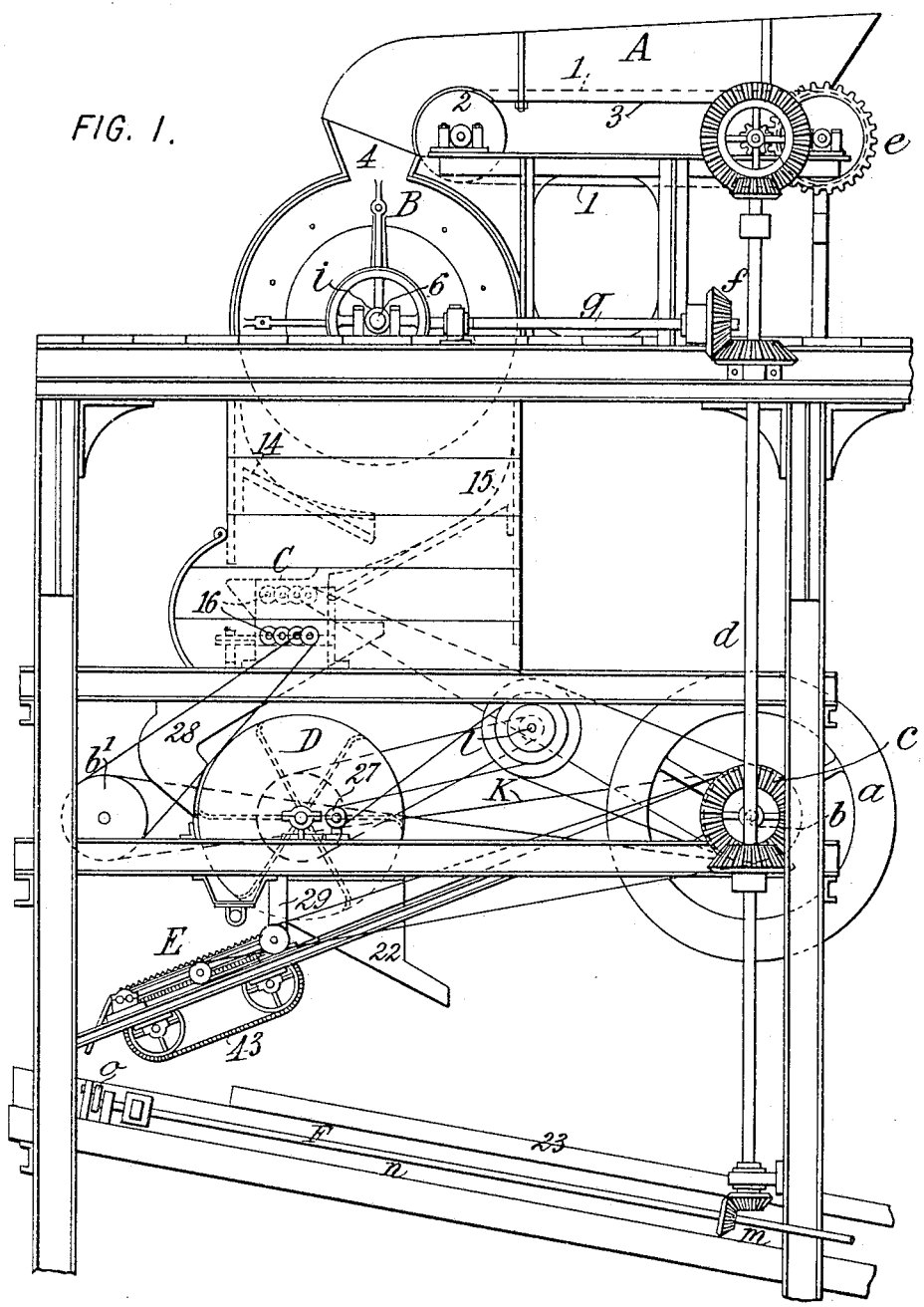

No. 781,671. PATENTED FEB. 7, 1905.
E. MERI.
MACHINE FOR PREPARING RAISINS IN BULK.
APPLICATION FILED DEC. 11, 1903.
6 SHEETS—SHEET 2.
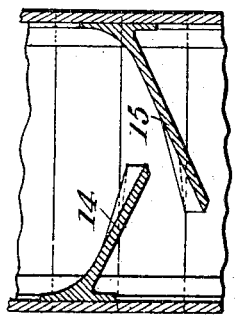
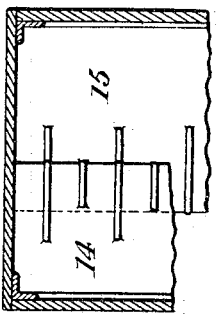
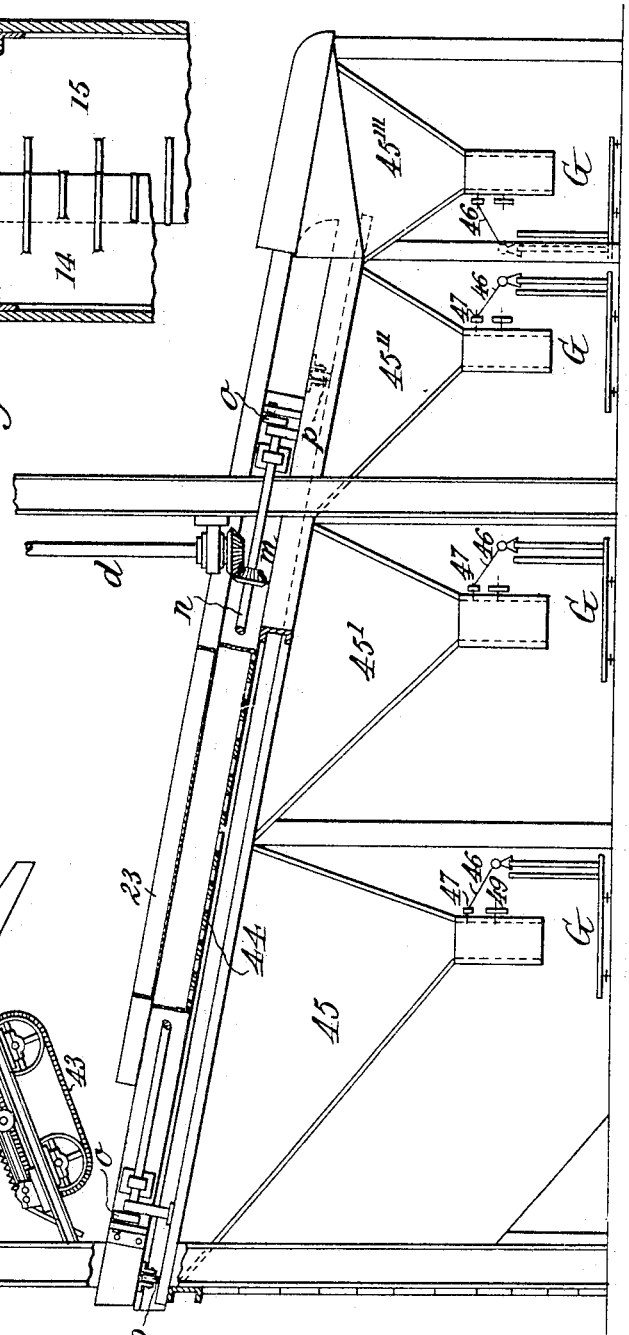
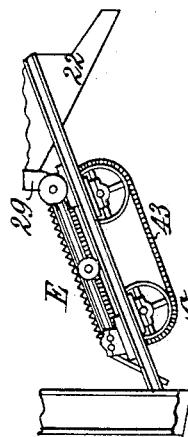
WITNESSES:
Fred White
René Bruine
INVENTOR:
Enrique Meri,
By Attorneys,
Arthur C. Fraser & Co No. 781,671. PATENTED FEB. 7, 1905.
E. MERI.
MACHINE FOR PREPARING RAISINS IN BULK.
APPLICATION FILED DEC. 11, 1903.

6 SHEETS—SHEET 3.

WITNESSES:
Fred White
René Ruine

INVENTOR:
Enrique Meri,
By Attorneys,
Arthur E. Fraser & Co.

No. 781,671. PATENTED FEB. 7, 1905.
E. MERI.
MACHINE FOR PREPARING RAISINS IN BULK.
APPLICATION FILED DEC. 11, 1903.

6 SHEETS—SHEET 4.

WITNESSES:
Fred White
René Buire

INVENTOR:
Enrique Meri,
By Attorneys,
Arthur C. Fraser & Co.

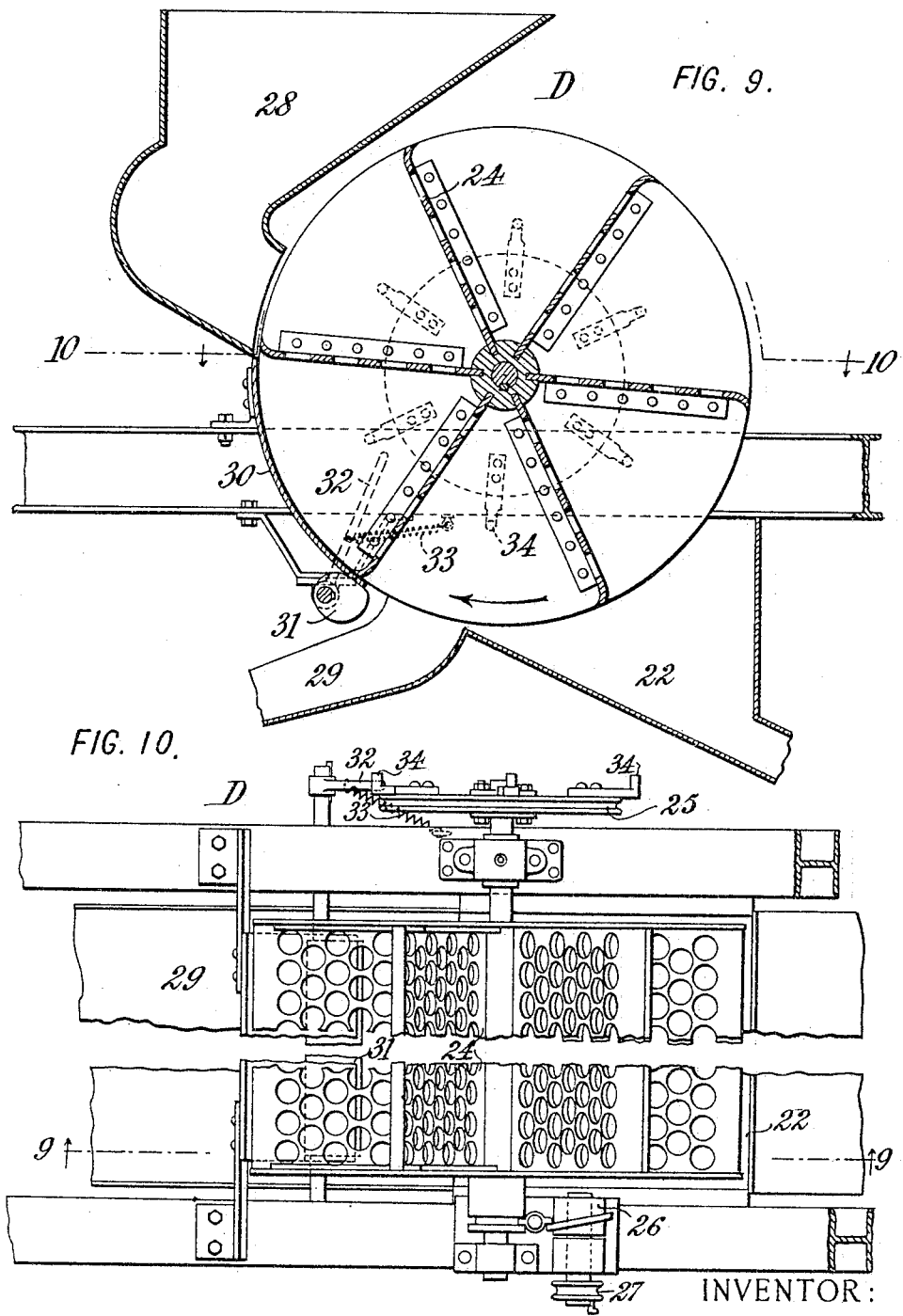

No. 781,671. PATENTED FEB. 7, 1905.
E. MERI.
MACHINE FOR PREPARING RAISINS IN BULK.
APPLICATION FILED DEC. 11, 1903.

6 SHEETS—SHEET 6.

WITNESSES:
Fred White
René Pruine

INVENTOR:
Enrique Meri,
By Attorneys,
Arthur E. Fraser & Co.

No. 781,671. Patented February 7, 1905.

UNITED STATES PATENT OFFICE.

ENRIQUE MERI, OF MADRID, SPAIN.

MACHINE FOR PREPARING RAISINS IN BULK.

SPECIFICATION forming part of Letters Patent No. 781,671, Patented February 7, 1905.

Application filed December 11, 1903. Serial No. 184,832.

*To all whom it may concern:*

Be it known that I, ENRIQUE MERI, a subject of the King of Spain, residing in Calle del Divino Pastor No. 2, Madrid, Spain, have invented certain new and useful Improvements in Machines for Preparing Raisins in Bulk, of which the following is a specification.

This invention relates especially to the production or preparation for the market of raisins which are sold in loose form, such as those of Corinth and others, and provides an apparatus by which the raisins may be handled in large quantities and may be handled and treated automatically from the moment in which they leave the drying-ground until they are ready for the market. It is customary now to prepare these raisins by hand according to processes which are much slower and less economical than the machine provided by this invention.

The raisins being carried to the machine from the drying-ground in wagons or by other suitable conveyers, it is necessary first to separate the bunches, which have become very much entangled with each other. Then in order to facilitate the picking of the raisins the individual bunches are arranged in elongated form. The picking is then proceeded with, the raisins being removed from the stalks in one operation and a subsequent operation being employed for separating the raisins into one receptacle and the stalks into another. The raisins thus freed from the larger stalks are then manipulated so as to remove the small stalks or tails which frequently adhere to the loose raisins. This is generally called "tailing." The raisins are then preferably sorted according to their size and weight and, if desired, packaged, all automatically.

The accompanying drawings illustrate an apparatus embodying the invention.

Figure 4:
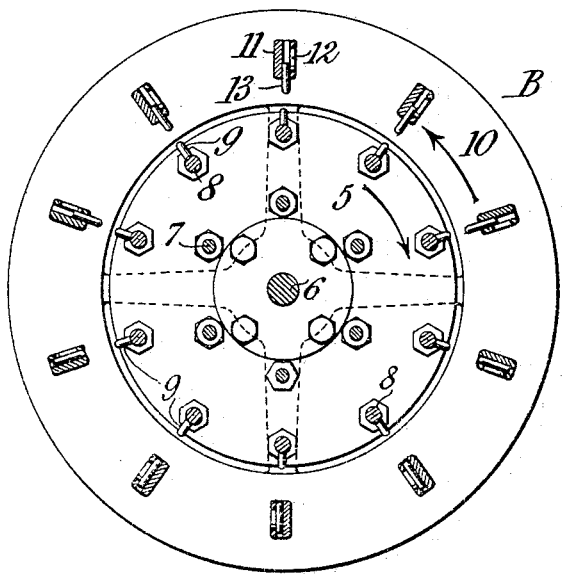
Figure 5:
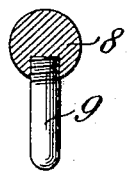
Figure 6:
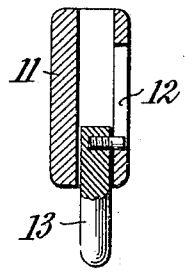
Figure 7:
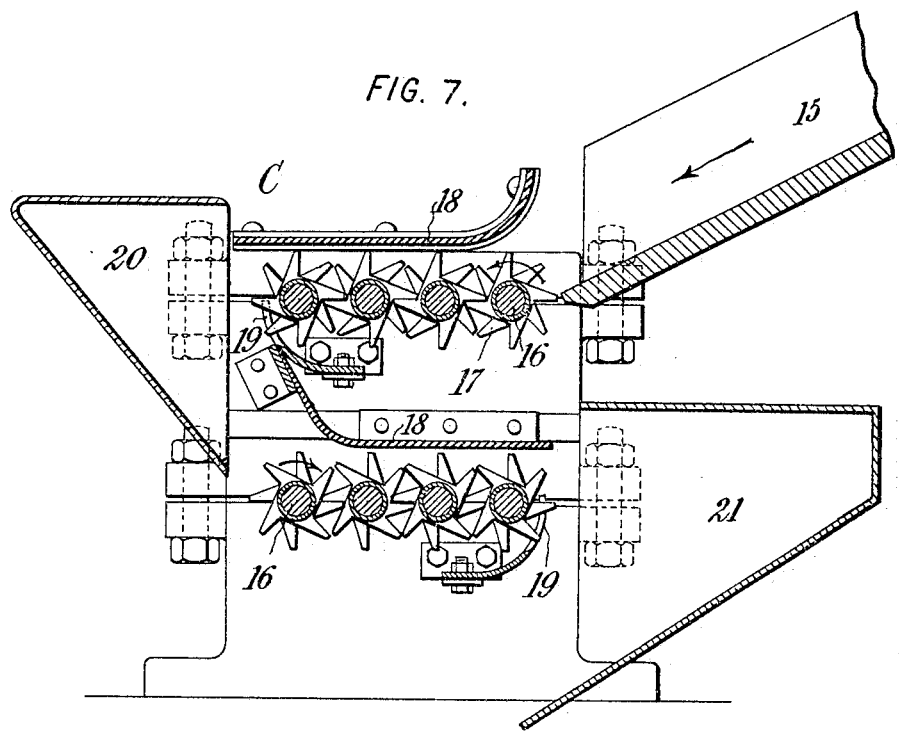
Figure 8:
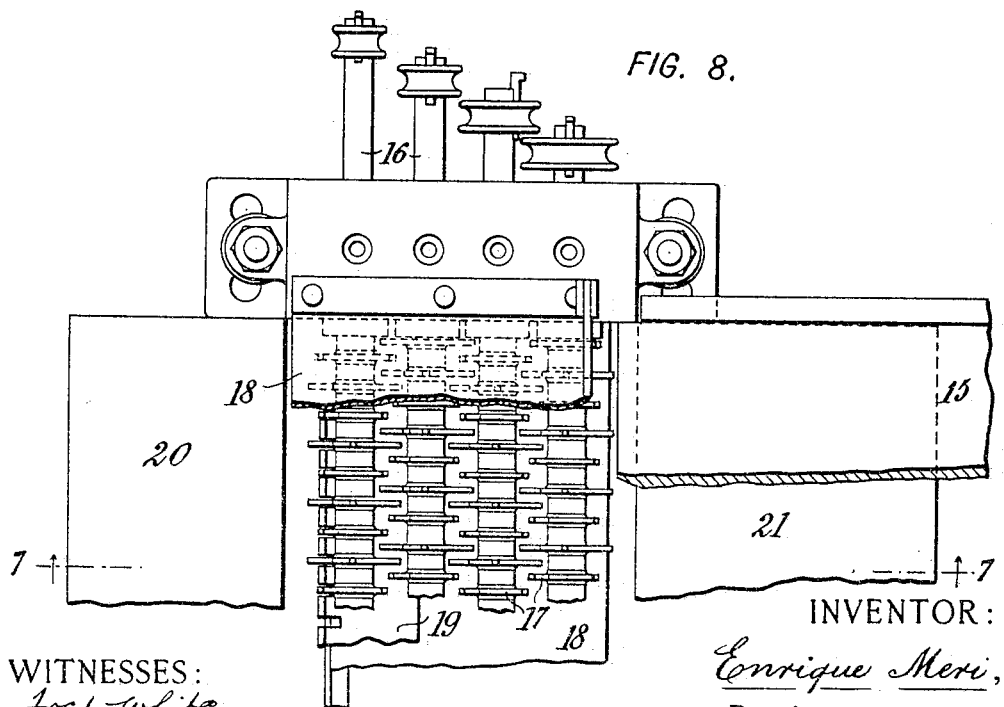
Figure 11:
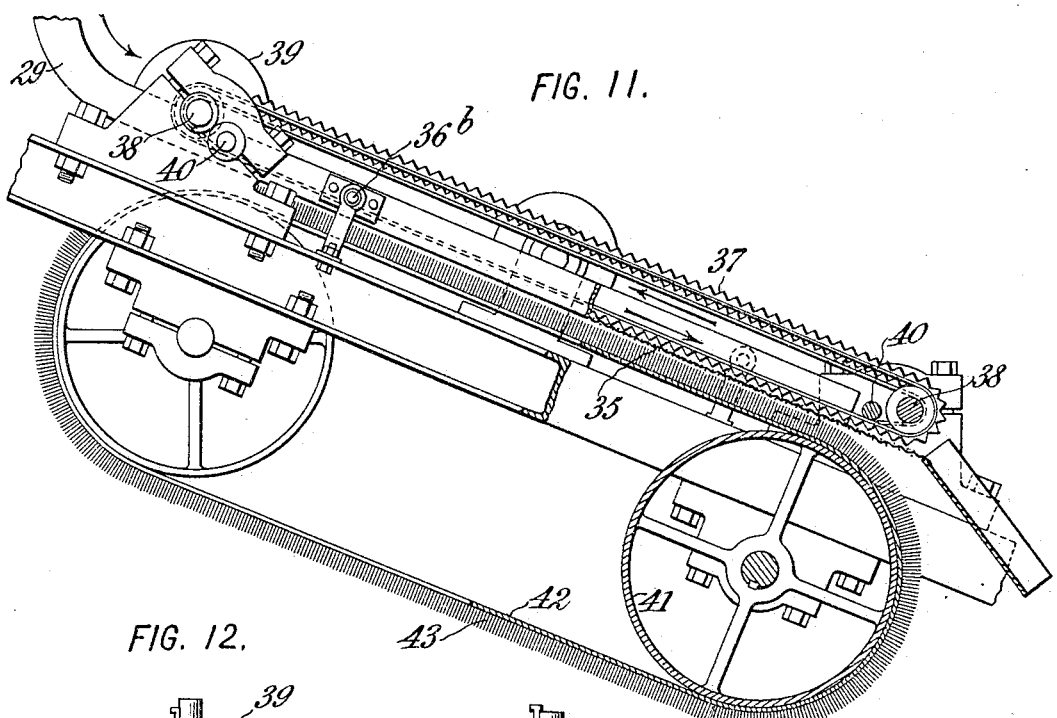
Figure 12:
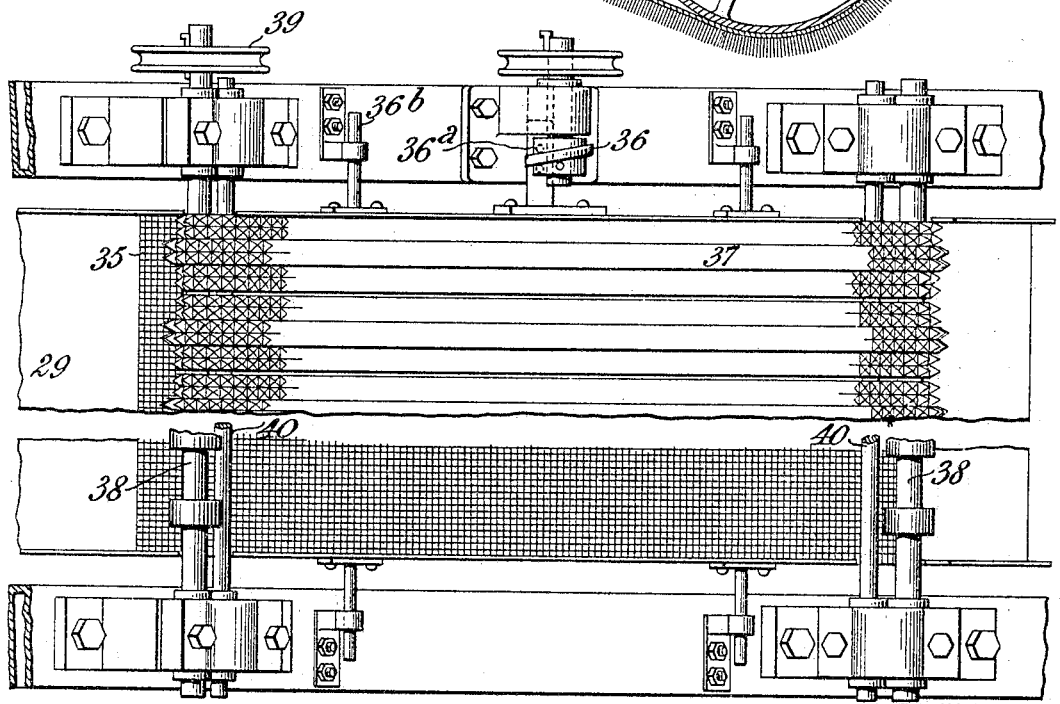

Figure 1 is a side elevation of the upper portion of the apparatus in which the various manipulations, except the final sorting and weighing, are carried on. Fig. 1ª is a side elevation of the lower portion of the machine, showing the mechanism for sorting and weighing. Fig. 2 is a detail of a portion of Fig. 1ª. Fig. 3 is a longitudinal section of the mechanism for separating the bunches from each other, which mechanism I generally term a "separating-drum." Fig. 4 is a transverse section of the same on the line 4 4 of Fig. 3. Figs. 5 and 6 are transverse sections of the inner and outer rods, respectively, of the separating-drum. Fig. 7 is a longitudinal section of the picking apparatus in which the raisins are torn from the stalks. Fig. 8 is a plan of a portion of the same. Fig. 9 is a longitudinal section of the mechanism for separating the loose raisins which have been previously picked from their stalks. Fig. 10 is a plan of the same with the central portion cut out. Fig. 11 is in part a side elevation and in part a longitudinal section of the tailing mechanism, the mechanism being viewed from the opposite side to that shown in Fig. 1. Fig. 12 is in part a plan and in part a section of the tailing apparatus. Figs. 13 and 14 are a vertical section and a plan, respectively, of a detail of construction.

Referring now to the machine illustrated, and especially to Fig. 1, A represents as a whole the load-carrier or conveyer upon which the raisins are dumped in a tangled mass and by which they are conveyed to the separating-drum, which is indicated as a whole by the letter B. The separated bunches after being elongated in the manner hereinafter described pass to the picking mechanism C and thence to the separating mechanism D, whereby they are picked from their stalks and the mass of raisins separated on one side and the mass of stalks on the other. From the separating mechanism D the raisins freed from stalks pass to the tailing mechanism E and thence to a sorting-sieve F, from which the different sizes pass to automatic weighing mechanisms G. The load-carrier A, which will be of a capacity in accordance with that of the rest of the apparatus, comprises a canvas belt 1, running around pulleys 2 and which is driven as hereinafter described. The upper portion of the belt travels in a trough 3, the bottom of which holds up the belt to prevent its sagging under the weight of the material and the sides of which prevent the raisins from falling over the sides of the belt. A chute 4 is provided at the upper end of the separating-drum, and the raisins from the carrier A drop through this chute. The drum comprises a pair of inner rings or disks 5, Fig. 3, on a rotating shaft 6, tied or braced together by means of two series of rods 7 and 8, of which the outer rods 8 carry each a series of fixed projecting pins or teeth 9. In the planes of the two rings 5 are arranged two outer rings 10, rigidly connected together and carried upon a sleeve $6^a$, revolubly mounted on the shaft 6. The rings 10 are connected by means of smooth bars 11. These bars are apertured and provided with slots 12, and they carry pins or teeth 13, which are provided with projections engaged in the slots 12, so that the pins 13 may move up and down freely. The shaft 6 and sleeve $6^a$ are provided with beveled pinions, which are driven from a common driving pinion, as shown, so as to rotate the shaft and sleeve in opposite directions. The operator spreads the load of raisins upon the belt of the carrier A as uniformly as possible in order to avoid the formation of heaps. As the load falls through the chute 4 the loose raisins and small loose bunches pass between the three series of rods 7, 8, and 11, traversing the drum from top to bottom. The larger bunches, especially those which are entangled with each other, are caught between the two outer series of rods 8 and 11 at the upper part of the drum, and the projecting teeth moving in opposite directions not only separate the bunches, but also effect a good deal of the pickings. The pins are not very sharp and are arranged at such a distance that they separate the bunches, but do not damage the raisins. The withdrawal of the teeth 13 in the lower half of the drum and the fact that pins 9 project downwardly avoid any difficulty in the passing of the bunches out of the drum. The numerous rods which the bunches have to strike in passing through the drum also separate those which are loosely entangled together. From the separating-drum the bunches fall upon guides 14 and 15, (best shown in Figs. 13 and 14,) which are provided with unequal alternate groovings, and the bunches are thus caused to take the elongated form and position which fits them most conveniently for the next operation of picking. The guides 14 and 15, as shown, are inclined, and the bunches pass through them by gravity to the picking mechanism C. The picking mechanism comprises two sets of horizontally-arranged shafts 16, carrying toothed plates 17, the plates or teeth on one shaft being positioned intermediately between two of the plates on the next shaft and successive plates on the same shaft being arranged with their teeth at an angle relatively to those of the next plate. An apron or cover 18, preferably of rubber or other yielding material, holds the bunches of raisins down upon the toothed shafts. At the end of each row of shafts a comb 19 is provided for forcibly withdrawing the stalks or raisins from the teeth. When the raisins have passed over the upper series of shafts, they are guided by a chute 20 to the lower series, where they move in the opposite direction and where the shafts likewise revolve in an opposite direction, where the same process is repeated. Obviously a different number of shafts 16 may be employed and the raisins may be passed over several series of shafts. They are finally discharged into a chute 21, which guides them to the separating mechanism. The teeth are preferably blunt or rounded at their ends. The arrangement of the successive teeth on each shaft at an angle (preferably forty-five degrees) to each other tends to lift the bunches upon the points and avoids the tendency to catch the raisins, which would occur if all the teeth on a shaft were on the same level. The toothed plates may be spaced apart from each other by the intermediate sleeves shown or in any other suitable manner. By means of the driving mechanism hereinafter described, the shafts 16 rotate with an increased velocity from the first to the last in each set. For example, the first shaft may revolve at forty revolutions per minute, the second at sixty, the third at ninety, and the last at one hundred and thirty-five. This result may be obtained, for example, by making the pulleys on the ends of the several shafts of gradually-decreasing diameter, as shown, supposing them to be driven by belts from power-pulleys of equal size. It will be understood that as a bunch of raisins is carried forward by the teeth on one shaft it is engaged by the intermediately-placed teeth on the next shaft, which moving at a more rapid rate pick off the raisins either individually or in smaller bunches. The remaining bunches in the mass become smaller and smaller until finally substantially all the individual raisins are picked from their stalks. The mass of mixed raisins and stalks is then to be separated, and this is accomplished in the separating-sieve D. The picked raisins and loose stalks pass from the chute 21 of the picking mechanism into the chute or hopper 28 of the separating-sieve, whence the separated stalks pass out by the chute 22 and the raisins by the chute 29. This is accomplished by a series of sieves, which allow the raisins to pass through and which throw out the remaining stalks. A series of shovels 24, having perforations sufficiently large to pass the larger raisins freely, have a slow rotating motion and at the same time a brisk lateral vibration which causes the loose raisins to drop through the perforations. As the rotation of the shovels continues the stalks are carried around and dumped into the chute 22. The shovels are preferably of aluminium and are arranged between the two circular disks shown. The circular movement is produced by a belt running around the pulley 25. The vibration is obtained by means of a belt running around the smaller pulley 27, which rotates the cam 26, from which a vibratory movement is transmitted to the shaft carrying the shovels and disks. The plate 30 forms a wall immediately below the chute 28 to prevent the load from falling over the edges of the shovels. In order to prevent the lower edge of the plate 30 from cutting the raisins between itself and the edge of the advancing shovel, means are provided for raising and lowering the lower edge of the plate just before the edge of each shovel reaches the plate. The means illustrated comprise a cam 31, mounted on a shaft carrying at its end a lever 32. A spring 33 maintains the cam in its lowered position. A series of arms 34 are mounted directly on pulley 25 slightly in advance of the shovels, and these arms engage the lever 32 and move it forward, so as to swing the cam 31 upward. This movement intercepts the fall of the raisins for a little while until a very small space—say three millimeters—remains between the lower edge of the plate 30 and the advancing edge of the shovel, whereupon the arm 34 passes beyond the lever 32 and the spring 33 brings the cam 31 down quickly and the lower edge of the plate 30 springs down so quickly that it is not possible for any raisin, however small it may be, to remain between the edges. The shovel which has just passed the lower edge of the plate 30 then receives the mass from the hopper 28 and shakes out the raisins, carrying the stalks upward until the shovel passes the vertical position. The stalks pass from the chute 22 to the inclined plane or trough 23, Fig. 1, which carries them out of the machine. The picked and separated raisins pass from the chute 29 to the tailing mechanism E, which is shown in detail in Figs. 11 and 12, (viewed from the side opposite to that shown in Fig. 1.) This apparatus comprises a floor or receiver 35, having meshes in which the tails may be easily caught, but so small as not to permit the smallest of the raisins to pass through. For example, floor 35 may be a fine-mesh wire screen. The raisins are rubbed over this floor to break off the tails. The rubbing action is preferably secured by vibrating the floor laterally and moving longitudinally over the floor a series of bands which press the raisins down and advance them longitudinally. The vibratory motion may be obtained, for example, from a cam 36, engaging pins 36ᵃ, connected to the side pieces of the floor or receiver, which side pieces have also guiding-pins 36ᵇ, moving in eyes fastened to the frame of the machine. The endless bands 37 are preferably formed with cloth backs and rubber faces roughened in pyramidal or other style. They pass over shafts 38 at opposite ends of the mechanism and are driven by a pulley 39. A number of separate bands are used, and these bands have two distinct velocities—that is to say, of three contiguous bands the one in the center travels at twice the rate of those at its sides, owing to the varying diameter of the shafts 38 at the points where the different bands pass over them. The shafts 40 serve to bring the lower stretches of all the belts in a single horizontal plane. It is understood that it is the lower stretches of the belts which perform the work. A second belt 42, preferably of canvas and carrying diagonal metallic brushing 43, passes over a pair of large pulleys 41. The tailing operation is effected, as stated, by the rubber bands dragging and rolling the raisins over the screen, they being assisted by the vibratory movement and by the roughness due to the pyramidal faces of the bands. The entire mechanism is inclined, as shown, and the raisins as they are freed from tails are gradually moved to the lower end of the floor and thence onto a chute, from which they pass to the sorting mechanism. The brush 43 keeps the wire-netting clean and free from the tailings of the raisins which are caught therein.

The sorting apparatus is illustrated in section in Fig. 1ᵃ and comprises an elongated inclined seive 44, preferably of sheet-iron, the perforations being of gradually-increasing size in the several sections, according to the raisins to be sorted. The latter on issuing from the sieves, sorted according to size, fall into the hoppers 45 45′, &c., which conduct them to the packing-cases placed upon the weighing-machines. The sieve is given a smart lateral vibratory motion to shake down the raisins by mechanism hereinafter described, being mounted on rollers $p$ at opposite ends, which preferably travel on metal rails on the supporting structure.

The weighing-machines (indicated diagrammatically at G) are of the ordinary type, of which the counterpoise is connected to a cord of non-elastic material, such as wire or silk, which, passing over a pulley 47, operates a pawl which engages teeth on the wheel 49. The wheel 49 is on the shaft of a series of revolving blades within the chute, and when the wheel 49 stops these revolving blades stop and prevent further passage of raisins to the weighing-machine. In this way an ordinary weighing-machine is made to serve as an automatic machine with very little sacrifice of precision. Even this sacrifice may be reduced to a negligible quantity after a little use by shifting the counterpoise a little.

The movements of the several parts of the apparatus may be obtained by various transmission devices. I will describe in detail one complete system, with special reference to Figs. 1 and 1ᵃ. The main driving-pulley $a$ is driven by steam, electricity, or other motive power. The shaft $b$ of this pulley carries a number of drums or pulleys for the operation of the picking mechanism C. Where the varying speeds of the several shafts in the picking mechanism are obtained by means of pulleys of different sizes on said shafts, as in Fig. 8, the pulleys on the shaft *b* may all be of one size. In Fig. 1, however, I have shown the pulleys on the picking mechanism all of the same size, and the pulleys on the shaft *b* will therefore be of four different sizes, as will be readily understood. A fifth pulley on the shaft *b*, by means of the crossed belt K, drives the pulley *b'* at the opposite side of the apparatus and from which the lower series of shafts of the picking mechanism are driven. For the sake of clearness only one belt is shown to each of the series of shafts of the picking mechanism; but it will be understood that each of the eight pulleys shown has a separate belt. On the shaft *b* there is also carried a bevel-gear *c*, which engages a bevel-pinion on the vertical shaft *d*. By means of the gearing *e* the movement of the shaft *d* is transmitted at a reduced speed to the belt of the load-carrier A. Movement is transmitted from the vertical shaft *d* to the separating-drum by means of bevel-pinions *f* and a horizontal shaft *g*, carrying at its end the pinion *h*, which drives the mechanism in the manner indicated in Fig. 3, turning the bevel-pinions *i* and *j*, and with them the inner and outer member of the drum, in opposite directions. For driving the separating-sieves D a set of intermediate pulleys *l* is driven by a belt from the shaft *b*. The smallest one of the pulleys *l* rotates the shovels slowly, while a larger one of said pulleys is belted to the pulley 27, which produces the quick vibratory movement. Movement of the tailing apparatus is accomplished directly by belting from the shaft *b*, one belt going to the pulley which drives the rubber belts or bands and the other going to the pulley for giving a vibratory motion. The sorting mechanism receives its motion from the vertical shaft *d* by means of a set of bevel-gears *m*, operating an inclined shaft *n*. The latter is provided at its opposite ends with cranks *o*, Fig. 2, which engage slotted brackets on the sides of the sieve 44 and communicate a smart vibratory motion to it. The sieve is provided at opposite ends with bearing-rollers *p* to facilitate the lateral movement.

Though I have described with great particularity of detail a complete apparatus embodying my invention, yet it is not to be understood that the invention is limited to the specific embodiment described. Various modifications thereof in the individual mechanisms and in the arrangement and combination of the parts may be made by those skilled in the art without departure from the invention.

What I claim is—

1. A machine for the preparation of raisins including a separating-drum having oppositely-rotating rings each carrying longitudinal bars with radial pins, the pins of the outer bars being projected inward and those of the inner bars being projected outward, through which bars the material passes, and by means of which pins the bunches are separated from each other as they fall through the drum.

2. A machine for the preparation of raisins including a separating-drum B having oppositely-rotating rings 5 and 10, the former carrying longitudinal bars 8 with outwardly-projecting pins 9, and the latter carrying bars 11 with inwardly-projecting pins 13 which are freely and automatically movable radially, whereby the bunches are separated from each other as they fall through the bars in the uppermost position and are permitted to fall freely through the bars in the lowermost position.

3. A machine for the preparation of raisins including a picking mechanism comprising a series of substantially parallel shafts, teeth on each of said shafts entering between the teeth on the adjacent shafts, and an apron or cover for pressing the material down upon the rotating teeth, whereby the raisins are picked or removed from the stalks.

4. A machine for the preparation of raisins including a picking mechanism comprising a series of substantially parallel shafts 16, toothed plates carried on each shaft, each of the plates on one shaft entering between two of the plates on another shaft, and the teeth of successive plates on the same shaft being arranged at an angle with each other, an apron or cover 18 holding the material down on the toothed shafts, and a comb 19 for separating the material from the teeth of the last shaft.

5. A machine for the preparation of raisins including mechanism for picking the raisins from the stalks, a series of shovels having perforations sufficiently large to pass the larger raisins freely, means for feeding the material from the said picking mechanism to said shovels, means for giving said shovels a slow rotating motion and at the same time a brisk lateral vibration, whereby the loose raisins are dropped through the perforations in the shovels and the loose stalks are carried off by the moving shovels.

6. A machine for the preparation of raisins including mechanism for picking the raisins from the stalks, a series of shovels 24 mounted on a central rotating shaft and having perforations sufficiently large to pass the larger raisins freely, means for giving said shaft also a brisk lateral vibration, a chute 28 for feeding the material from said picking mechanism to said shovels, a plate 30 below the lower mouth of said chute and engaging the outer edges of said shovels to prevent the material from falling over said edges, and means for raising and lowering the lower edge of said plate 30 before the edge of each shovel reaches the lower edge of the plate 30, so as to prevent cutting of the raisins at this point.

7. A machine for the preparation of raisins including in combination mechanism for picking the raisins from the main stalks, and mechanism for tailing the raisins or removing the small stalks adhering thereto, the latter mechanism comprising a floor having meshes in which the tails may be easily caught, but so small as not to permit the smallest of the raisins to pass through, means for subjecting said floor to a lateral vibratory motion, and a series of bands moving longitudinally above said floor, pressing the raisins down upon the floor and advancing them longitudinally.

8. A machine for the preparation of raisins including in combination mechanism for picking the raisins from the main stalks, and mechanism for tailing the raisins or removing the small stalks adhering thereto, the latter mechanism comprising a floor having meshes in which the tails may be easily caught, but so small as not to permit the smallest of the raisins to pass through, means for subjecting said floor to a lateral vibratory motion, and a series of bands 37 having projections on their outer faces and moving in a longitudinal direction above said floor with different velocities, rubbing the raisins over the floor and advancing them longitudinally.

9. A machine for the preparation of raisins, including in combination mechanism for picking the raisins from the stalks, and grooved guides 14 15 arranged one below the other and having unequal alternate grooves serving to give the bunches an elongated formation and from which the bunches are conducted to said picking mechanism.

10. A machine for the preparation of raisins, including in combination mechanism for picking the raisins from the stalks having a series of substantially parallel shafts and toothed picking-plates carried thereon, mechanism for separating the loose raisins from the loose stalks having a series of shovels having perforations, and means for giving such shovels a slow rotating motion and a brisk lateral vibration, mechanism for removing the small stalks adhering, and means for conducting the material to each said mechanisms in the order stated.

11. A machine for the preparation of raisins, including in combination a mechanism for separating the bunches from each other, having a separating-drum having oppositely-rotating rings, each carrying longitudinal bars with radial pins, the pins of the outer bars being projected inward, and those of the inner bars being projected outward, mechanism for picking the raisins from the stalks, having a series of substantially parallel shafts and toothed picking-plates carried thereon, mechanism for separating the loose raisins from the loose stalks, having a series of shovels having perforations, and means for giving such shovels a slow rotating motion and a brisk lateral vibration, mechanism for removing the small stalks adhering, and means for conducting the material to each said mechanisms in the order stated.

In testimony that I claim the foregoing as my invention I have signed my name, at Madrid, November 26, 1903, in presence of two subscribing witnesses.

ENRIQUE MERI.

Witnesses:
  JULIAN GONZALES,
  ADOLPH DANZIGER.